United States Patent [19]

Allen, Sr. et al.

[11] 4,367,646

[45] Jan. 11, 1983

[54] APPARATUS AND METHOD FOR DETECTING AND MEASURING LOCALIZED AREAS OF DETERIORATION ON THE INTERIOR OF TUBES

[76] Inventors: J. Hunter Allen, Sr., Rte. 7, Box 1074, Mt. Juliet, Tenn. 37122; Amos L. Gillespie, Jr., 1184 Ashley Lake Dr., Marietta, Ga. 30067; George D. Johnson, 3358 Ezell Rd., Nashville, Tenn. 37211

[21] Appl. No.: 204,961

[22] Filed: Nov. 7, 1980

[51] Int. Cl.³ .................... G01B 13/22; G01B 13/10
[52] U.S. Cl. ...................................... 73/37.9; 73/4 R
[58] Field of Search ................... 73/37.9, 37.5, 4 R

[56] References Cited

U.S. PATENT DOCUMENTS 3,438,244  4/1969  Plumpe, Jr. .................... 73/37.9
4,125,011  11/1978  Porter ........................ 73/37.9 X R

FOREIGN PATENT DOCUMENTS

251837  2/1970  U.S.S.R. ......................... 73/37.9

Primary Examiner—S. Clement Swisher
Assistant Examiner—Joseph W. Roskos
Attorney, Agent, or Firm—Beveridge, DeGrandi & Kline

[57] ABSTRACT

A method and apparatus for detecting, measuring the extent of and locating localized areas of deterioration, such as pitting, in the interior walls of tubing or other hollow objects. A cylindrical pneumatic probe with its air input side connected to a constant flow source of pressurized air and having a transversely extending baffle ring with a sharp outer edge across which the flow of air from said source is directed through the sharp edged orifice created between the baffle ring sharp outer edge and the tube inner wall and a pressure transducer connected to the probe air input air generates signals transmitted to a visual recording device connected to the pressure transducer. In the method the pneumatic probe having its thin outer edged baffle ring of a diameter closely matching that of the tube interior to be inspected is connected to a constant pressure air source. The probe is inserted into a flawless tube base standard test tube having a diameter equal to the tube to be inspected and a constant flow of air is passed through the probe with the back pressure generated by the base standard test tube being measured and established as a zero based value. The probe is then inserted into a succession of flawless calibration tubes of increasing size increments and the back pressure is recorded for each successive calibration tube in relationship to the zero base value. The tube is then inserted into and passed along a length of a tube to be inspected and the measured back pressure is recorded for each increment of length of the tube with respect to the zero based value and back pressure generated by the succession of flawless tube of increased diameter.

17 Claims, 14 Drawing Figures

G — PITTED AREA OF .057" DEPTH
H — PITTED AREA OF .032" DEPTH

PROBE TRAVEL →

FIG. 9

PROBE TRAVEL →

A — PITTED AREA OF .010 DEPTH AND 1/2" LONG
B — 1/4" DRILLED HOLE      C — 1/8" DRILLED HOLE
D — 1/16" DRILLED HOLE     E — .030" DEEP GROOVE
F — .060 DEEP GROOVE

APPARATUS AND METHOD FOR DETECTING AND MEASURING LOCALIZED AREAS OF DETERIORATION ON THE INTERIOR OF TUBES

BACKGROUND OF THE INVENTION

This invention relates to a method and apparatus for detecting defects on the interior of a tube or the individual tubes of tube bundles widely utilized in petroleum refineries, condensers, steam boilers and the like to determine the exact location and degree of localized tube interior deterioration that has occurred through erosion, corrosion, pitting and other causes for material on the interior surface of the individual tubes being displaced and eaten away.

The tubes in boilers, oil refineries and the like are subjected to high pressure exceeding 1,000 pounds per square inch. The flow of liquids, which are often corrosive in nature, through the tubes causes localized or generalized pitting and thinning of the tube walls. Therefore, as a safety measure non-destructive tests of the tubes should be made at intervals to determine if there are areas in the walls of any of the tubes which have been weakened by erosion, corrosion or pitting to the point where these weakened sections of the tubes should be cut out and replaced or the entire tube replaced. Up to this time there have been few satisfactory non-destructive methods of testing tubes, particularly in testing tubes on the interior of tube bundles. Eddy current testing, through introducing a probe into the tube to induce an electro-magnetic field in the sections of the tube through which the probe traverses, can be used for non-ferrous tubes but is not satisfactory for ferrous tubes which become magnetized by the induced field of the probe which cancels out the test results. A technique utilizing a D.C. saturation coil in connection with the probe to reduce the magnetic permeability of the ferrous tube to zero has been partially successful but the inherent problems have kept this new testing procedure from being generally accepted. Ultrasonic testing has also been utilized in which the tubes are traversed by a piezo electric crystal. However, water must be used as a coupler between the piezo crystal and the tube wall, and water is unacceptable in some tube environments such as those which are exposed to acidic conditions. Further, this method is quite time consuming.

The present invention utilizes some of the basic principles of pneumatic gauging devices, sometimes known as air micrometers, which have been commonly utilized in many forms to determine the internal dimensions of hollow objects. Such devices include a probe having fixed orifices and connected to a source of air pressure. The probe is inserted into a workpiece having unknown internal dimensions and the back pressure created by the air flow through the probe is compared to the back pressure created by the probe in a bore of known dimensions to provide an indication of the unknown internal dimensions. Typical of such pneumatic gauging apparatus are the devices disclosed in U.S. Pat. Nos. 3,438,224; 4,088,009 and 4,125,011. However, these devices are designed to determine the average internal dimensions of the hollow object being measured and do not detect small localized areas of pitting. The problem faced by the applicant is that of detecting, accurately locating and measuring the depth of small localized areas of deterioration, of which pitting is the most serious. Although the prior art devices might detect the overall thinning of a major segment of the tube wall due to a washing type of displacement of tube wall material along a significant portion of the tube, these prior art gauging devices will not detect, locate and measure the depth of small localized areas of pitting. Localized pitting is much more serious than a generalized reduction of the tube wall thickness. A tube having the wall thickness reduced to a given amount in a small localized area from pitting will blow out whereas a tube having its overall wall area thinned to the same amount will not. Therefore, the detection and location of localized areas of tube interior pitting is of maximum importance.

SUMMARY OF THE INVENTION

The applicant's invention solves the problem of detecting and locating localized areas of internal pitting in tubing by utilizing a probe of a configuration in which the back pressure is established by causing the air to flow across a sharp edged orifice created between the tube wall interior and a narrow baffle ring machined onto the probe and converting this measured back pressure into an electronic signal by the use of a pressure transducer and recording the output on a chart recording device. As the probe, having the sharp edged baffle ring of a diameter closely matching that of the tube being inspected and contained within a recess in the probe, is drawn along the length of the tube; when the sharp edge of the baffle ring reaches a pitted area in the tube the momentary increase in the size of the sharp edged and narrow orifice through which the air flows between the baffle ring and the tube wall will create a momentary decrease in the back pressure which will be recorded as a sharp discontinuity on the chart of the recorder with the amplitude of the discontinuity being a direct indication of the depth of the pitting. The breadth of the discontinuity will also relate to the length of the pitted area. Since the length of the chart recording is directly related to the length of the tube along which the probe is traversed, the localized areas of deterioration can be located on the tube and the deteriorated areas can be cut out if desired.

A primary object of the invention is to provide a nondestructive testing procedure to detect all types of deterioration on the interior of tubing caused by displacement of the tube wall material due to galvanic corrosion, erosion, pitting and the like.

A further object of the invention is to provide a method and apparatus for measuring and locating localized areas of deterioration in the interior of all types of tubing.

A yet still further object of the invention is to produce a method and apparatus that will detect, locate and measure the depth of small areas of pitting in all types of tubing, particularly ferrous tubing.

Still further objects and utilitarian features of the invention will become apparent from the following description taken in connection with the accompanying drawings in which:

DETAILED DESCRIPTION OF THE INVENTION

Figure 1:
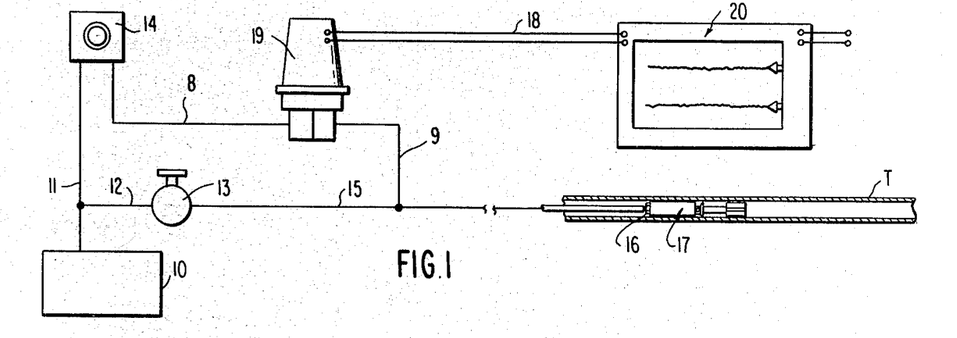
FIG. 1 is a schematic diagram of the detection apparatus.

The components in a preferred embodiment of the invention are schematically illustrated in FIG. 1 which represents a source of constant air pressure, although there is no reason why another type of gas could not be utilized should the economics dictate. The constant pressure source 10 is connected in parallel to a pressure regulating device 14 and a flow limiting device 13 through lines 11 and 12. The pressure regulating device can conveniently be a pneumatic Gradual Switch Model S-224 manufactured by Johnson Controls. This switch is a remote control switch utilizing a proportional action relay which will maintain a selected output pressure setting until it is readjusted. The flow control device can conveniently be a globe valve through which the flow of the air can be regulated by adjusting the valve. Line 15 connects the flow control device 13 to the air supply connection 16 of the probe 17 that is contained within and is traversed along the length of the tube T. A differential pressure transducer 19 is connected by lines 8 and 9 between the pressure regulating device 14 and the probe air pressure supply line 15. A suitable differential pressure transducer is a Model PDH 3000 Series Transmitter produced by Gould and illustrated in its Bulletin TP 136B. The output of the differential pressure transducer 19 is connected by wires 18 to a chart recording device 20, which can be any standard type of recording device such as one in which a pen records the amplitude of the pressure signals received from the differential pressure transducer as an ordinate with the horizontal travel of the recorder pen recorded as the abscissa.

Figure 2:
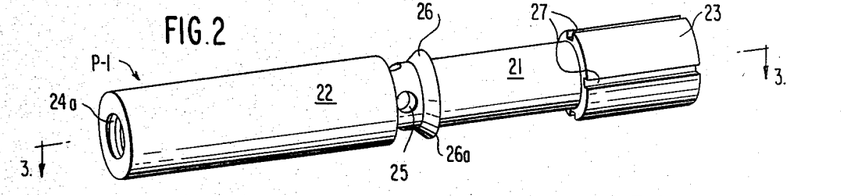
FIG. 2 is a perspective view of one of the lesser effective embodiments of a pneumatic probe used in the apparatus.
Figure 3:
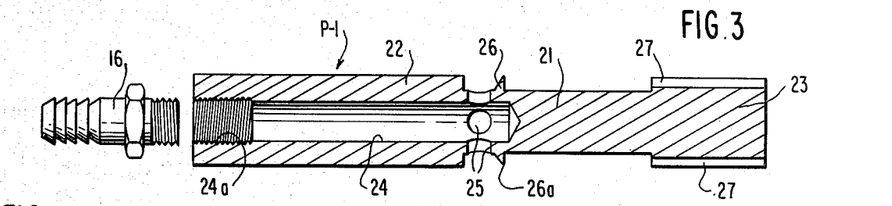
FIG. 3 is a cross sectional view of the probe of FIG. 2 taken along section line 3—3 of FIG. 2 and also including an air hose connection fitting.
Figure 6:
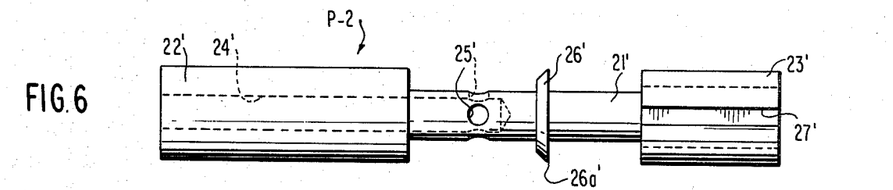
FIG. 6 is a side elevation view of an improved embodiment of a probe similar to that of FIG. 2.
Figure 7:
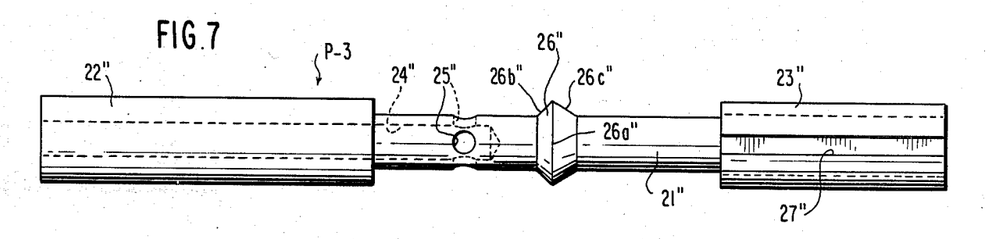
FIG. 7 is a side elevation view of another embodiment of an improved probe.
Figures 8, 10:
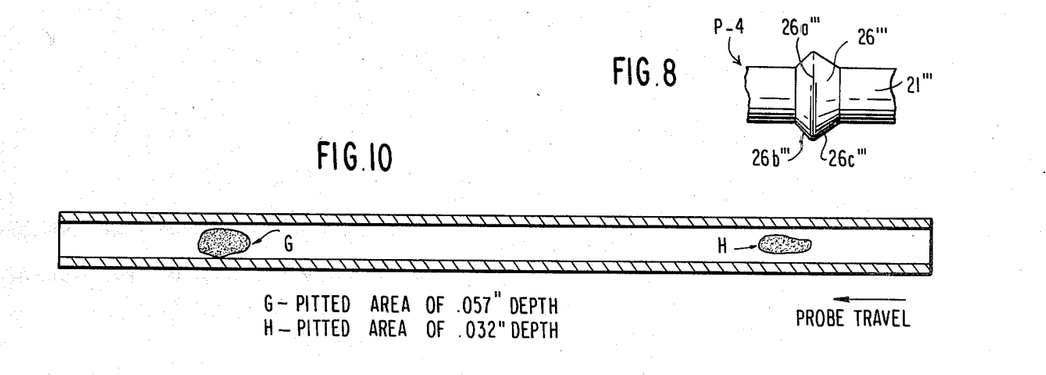
FIG. 8 is a partial side elevation view of a modified embodiment of the probe of FIG. 7.
FIG. 10 is a cross sectional view of another tube for testing into which defects were deliberately machined onto the interior.

FIGS. 2 and 3 illustrate the general arrangement and basic features that are required in the embodiment of a probe which will satisfactorily detect localized areas of pitting and deterioration in the interior of tubes. However, the modified embodiments illustrated in FIGS. 6–8 provide improvements over the design of the initial embodiment illustrated in FIGS. 2 and 3. The modifications of the basic design of FIGS. 2 and 3 and the test results supporting these modifications of FIGS. 6–8 will be subsequently discussed.

The cylindrical probe P-1 of FIGS. 2 and 3 has a recessed center portion 21 of substantially lesser diameter than the supply end portion 22 and exhaust end portion 23 that are located on opposite ends of the probe. An internal passage 24 extends from a threaded entrance 24a at the supply end of the probe, along the length of the larger diameter probe supply portion and into the recessed center portion 21 in communication with apertures 25 extending between the internal passage 24 and the surface of the center section 21. A baffle ring 26 is machined into the recessed center section 21 between the apertures 25 and the exhaust end portion 23. The outwardly extending baffle ring 26 has a circumferential cross section that tapers from a thicker portion at the juncture with the center section 21 to a thin or sharp edge tip 26a constituting the outer rim edge of the baffle ring. The exhaust end portion 23 contains a plurality of grooves 27 that extend longitudinally of the exhaust portion between the recessed center section 21 and the outer end of the exhaust end portion of the probe. The threaded air hose connection fitting 16, threaded into the threaded portion 24a of the passage 24, connects the probe internal air passage 24 to the air supply line 15.

Referring now to the improved embodiments shown in FIGS. 6–8, it can be seen that the same basic structural features of FIG. 2 are included but the shape and position of the baffle ring is modified, the same structural reference numerals being utilized as in FIGS. 2 and 3 but a prime being added in FIG. 6, a double prime in FIG. 7 and a triple prime in FIG. 8. For easier identification the probe of FIGS. 2 and 3 is identified as P-1, the probe of FIG. 6 as probe P-2, the probe of FIG. 7 as probe P-3, and the probe of FIG. 8 as probe P-4. As is readily apparent from comparing the probe P-1 to the probe P-2, the only difference is that the baffle ring 26' of probe P-2 is located along the length of the center portion 21' a substantial fraction of the distance between the two end portions 22' and 23' with the apertures 25' being located centrally between the inner end of the supply end portion 22' and the baffle ring 26'. The embodiment of the probe P-3 is similar to that of probe P-2 except that the baffle ring 26" has a slanted, converging front surface 26b" and a diverging trailing surface 26c". In the particular illustrated embodiment the front surface converges at a 30° angle and the trailing surface diverges at a 45° angle, but these particular angles do not appear to be crucial. The probe P-4 of FIG. 8 is identical to that of probe P-3 of FIG. 7 except that the outer rim edge 26a''' has been gently rounded. The diameter of the supply end portion of all probes, corresponding to reference numeral 22 of probe P-1, should closely match the interior diameter of the tube being tested with sufficient clearance to permit it to pass freely along the length of the tube. An optimum range of diameters would be between approximately 0.020" and 0.050" less than the minimum tube diameter of the tube being examined for maximum test resolution. The diameter of the exhaust end portion of the probes, corresponding to reference number 23 of probe P-1, should be substantially the same as that of the supply end portion but can be several thousandths of an inch less. The diameter of the baffle ring optimally should be substantially the same as the supply end portion of the probe but can be slightly less in the range of the diameter of the exhaust end portion of the probe. For optimum results the outer sharp rim edge of the baffle rings of all probes, corresponding to item 26a of probe P-1, should be in the range of 0.005" and 0.050", the outer rim edge 26a''' of probe P-4 being that of a sharp edged probe gently rounded by being lightly buffed with emery cloth or other equivalent procedure.

The diameters of the recessed center portions of all probes, corresponding to item 21 of probe P-1, are substantially less than the diameters of the end portions in the general range of 25 to 50%, or sufficient to minimize back pressure effects and maintain a non-turbulent flow of air onto and across the sharp outer edge of the baffle ring. For optimum results the length of the air supply end portion of a probe should be greater than the exhaust end portion and at least equal to or less than the recessed central portion. The length of the exhaust end portion of the probe can be less than the recessed center portion but should be sufficiently great to provide stability of the probe when traversing the interior of the tube being inspected. The exhaust end portion might be eliminated if the supply end portion is sufficiently long to stabilize the travel of the probe through the tubing but is incorporated in the tubes tested to insure optimum results. The axially extending grooves of the exhaust end portion of the tube, their arrangement and depth should be such as to minimize the drop in pressure of the air flowing after the air flow across the relatively sharp outer edge of the baffle ring and exhausts across the exhaust end portion. Likewise the diameter of the internal air supply passages and aperture into the recess central portion should be such as to minimize back pressure.

Figure 5:
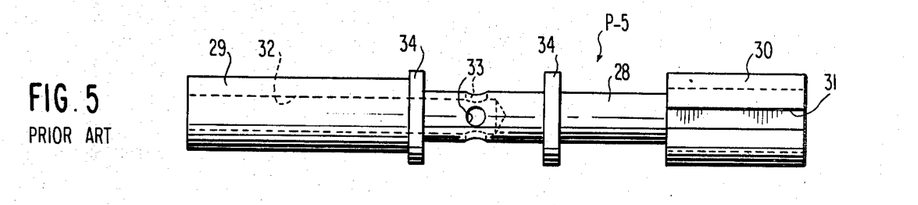
FIG. 5 is a side elevation view of a prior art pneumatic probe.

FIG. 5 represents a prior art probe P-5 of a general nature as disclosed in U.S. Pat. No. 3,438,244 of Plumpe and is illustrated and discussed in connection with comparative test results with probes P-1 to P-4. As can be ascertained, probe P-5 is quite similar to probes P-1 through P-4 in many respects, having a central recessed center portion 28 of substantially lesser diameter and located between the end portion of the air supply end 29 and the exhaust end 30. The exhaust end portion 30 contains the axially extending grooves 31 as is the case with the probes of the applicant's invention. Air is admitted to the recessed central portion 28 through the passage 32 that extends from the end of the probe connected to the air supply into communication with the apertures 33. A pair of gauging rings 34 are located in a spaced-apart relationship on either side of the air passage apertures 33 in the recess central portion 28, the supply air end portion extending forwardly from the gauging ring. The gauging rings 34 are relatively wide as compared to the sharp edge 26a of the baffle ring of the applicant's invention.

Figure 9:
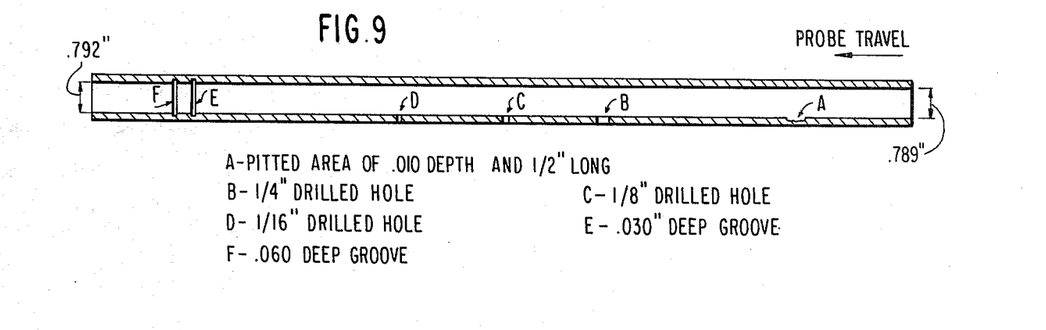
FIG. 9 is a cross sectional view of a tube for testing in which known defects have been deliberately machined onto the interior.

FIGS. 9 and 10 contain representations of demonstration tubes in which defects were machined into the interior of the tubes for test and demonstration purposes, the tube of FIG. 9 being a metal tube whereas the tube of FIG. 10 is a carefully machined tube of acrylic material. This, of course, demonstrates that the applicant's invention can be utilized in checking tubes made from any material. The test results that were produced with the embodiments of probes P-1 through P-5 with respect to the defects in the tubes of FIGS. 9 and 10 are reported after the following description of the test procedure that is utilized in inspecting tubes to detect, locate and measure deterioration, both localized and general in extend. The dimensions of the defects are indicated on the drawings and the direction of probe travel from right to left is that indicated by the arrows.

The procedure for inspecting tubing is according to the following sequence of indicated steps:

1. Determine the minimum interior diameter of the tubes to be inspected. This preferably should be accomplished by reference to the manufacturer's specifications.

2. Select a probe having a maximum diameter that can pass freely through the length of the tubing to be inspected. The probe maximum diameter should be approximately 0.020" less than the minimum inside diameter of the tubing but should not exceed approximately 0.050" less than the mimimum diameter of the tubing for optimum testing results.

3. Set the flow limiting device 13 at an air flow rate which experience indicates will provide a maximum amplitude of travel for the recorder pen when the system is calibrated to record the entire range of tubing diameter defects that are acceptable. It has been determined by experience that for a tube wall-to-probe clearance of 0.030" and a tubing minimum inside diameter of approximately 0.782", the air flow rate should range between approximately 4–6 SCFM (standard cubic feet per minute). Larger clearances between the probe and the tube interior surface and larger tube inside diameters will normally require higher flow rates.

4. Introduce the probe into a base standard test tube having an unflawed interior diameter conforming to that specified by the tube manufacturer for a tube of the type that is to be inspected.

5. Adjust the output pressure of the pressure regulating device 14 to establish a zero output of the differential pressure transmitter as recorded by the chart recording device 20. This is the zero based value from which the calibration and inspection will be conducted. When properly zeroed the output of the differential pressure transducer will be at the minimum value and the output would increase if the clearance between the probe baffle ring and the wall of the tube is increased at any point of travel.

6. Span the output of the differential pressure transducer by suitable adjustments such as: an adjustment of the differential pressure converter span adjustment, an adjustment of the variable resistor across the output of the differential pressure transducer when the recorder responds to input voltage only, adjust the supply voltage output to the differential pressure transducer by an adjustment of the resistor in the power supply that is integral to the recorder, or by adjusting the sensitivity of the recorder span in the recorder assembly. The purpose of this step is to create a maximum amplitude in the travel of the recorder pen over the range of the measurements that will be conducted.

7. If the span covered by the recorder pen is not sufficiently wide after the adjustments in step 5, the air flow rate of step 3 will have to be adjusted by increasing or decreasing the air flow rate followed by repeating steps 4, 5 and 6. Step 7 is then repeated to provide the maximum deflection of the recorder pen.

8. Establish recorder pen amplitude values by introducing the probe into unflawed standard test tubes having increasing inside diameters over that of the base standard test tube. such as incremental increases in diameter of 0.010", 0.015" or any other convenient amount through a range which will provide for a measurement of increased wall interior diameter up to the amount at which the wall thickness has has decreased to an unacceptable degree. These values then indicate the pen amplitude values which may be equated to an increase in the tube wall interior diameter (or decrease in wall thickness) through pitting or other deterioration.

9. Pass the probe through the tubes to be inspected. The recorder pen will then indicate the presence of defective areas in the tube as the probe passes along the length of the tubing. When the sharp outer edge of the baffle ring encounters a localized defective area in the interior of the tubing the amplitude of the recorder pen will momentarily increase in proportion to the depth of the pitted area and the length of the pen deflection will be an indication of the span of the defective area. The travel of the probe along the length of the tube being at a constant rate, the location of the pitted area can be determined with reference to the position of the pen deflections along the travel of the recorder pen.

Figure 4:
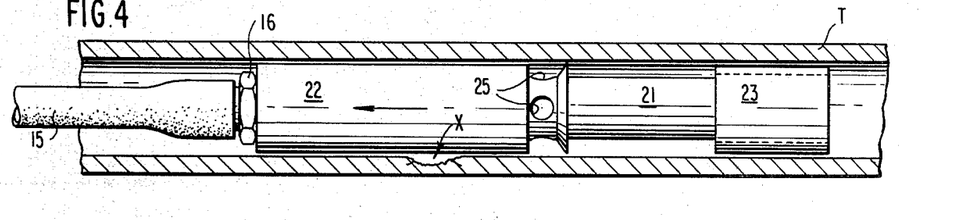
FIG. 4 is a cross sectional, elevation view of the probe of FIG. 2 within a tube being tested.
Figure 11:
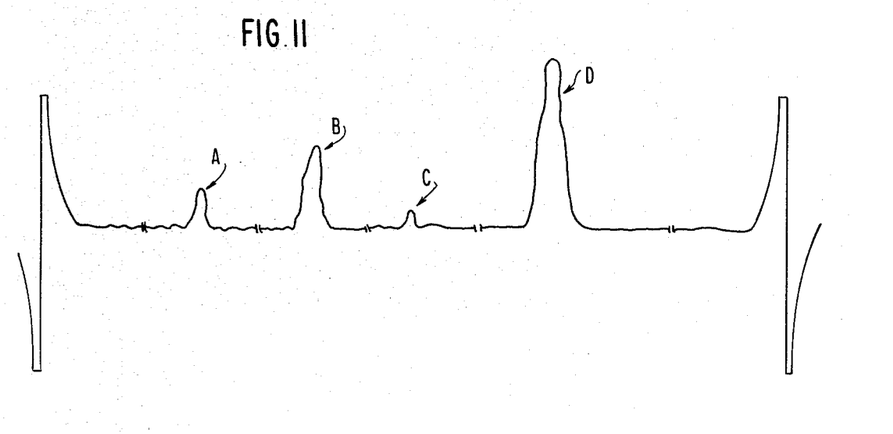
FIG. 11 is a drawing of a representative chart recording of an inspected tube.

FIG. 11 is representative of a recording chart in which the probe encountered a number of pitted areas of varying depth along the length of the tubing inspected. Deflection A of the recording of FIG. 11 might represent a deteriorated spot constituting a ten percent reduction in tube wall thickness, deflection B representing a localized deterioration involving a 25% reduction in the tube wall thickness, deflection C representing a minor deteriorated area representing a 5% loss of tubing wall thickness and deflection D representing a major defective area representing a 90% loss of tube wall thickness. Although not to scale, the area identified by the letter X in FIG. 4 could consititute one of the localized deteriorated areas in the tubing that would be detected and located by one of the recorder deflections illustrated in FIG. 11 as the edge of the baffle ring passes over it. Subsequent to the first tests of probe P-1 (FIG. 2), further tests indicated that modifications relating to the shape and arrangement of the baffle ring affected the performance of the probe. As will be shown in the FIGS. 12, 13 and 14 reproductions of chart recordings of tests results of several different embodiments of probes, the structural changes incorporated in probes P-2 (FIG. 6), P-3 (FIG. 7) and P-4 (FIG. 8) resulted in an improved performance over probe P-1. In general, these improvements appear to be related to minimizing or eliminating turbulence in the flow of air as it passes into the space ahead of the baffle ring and then across the narrow orifice space established between the relatively sharp outer rim of the baffle ring and the tube wall interior.

Figure 12:
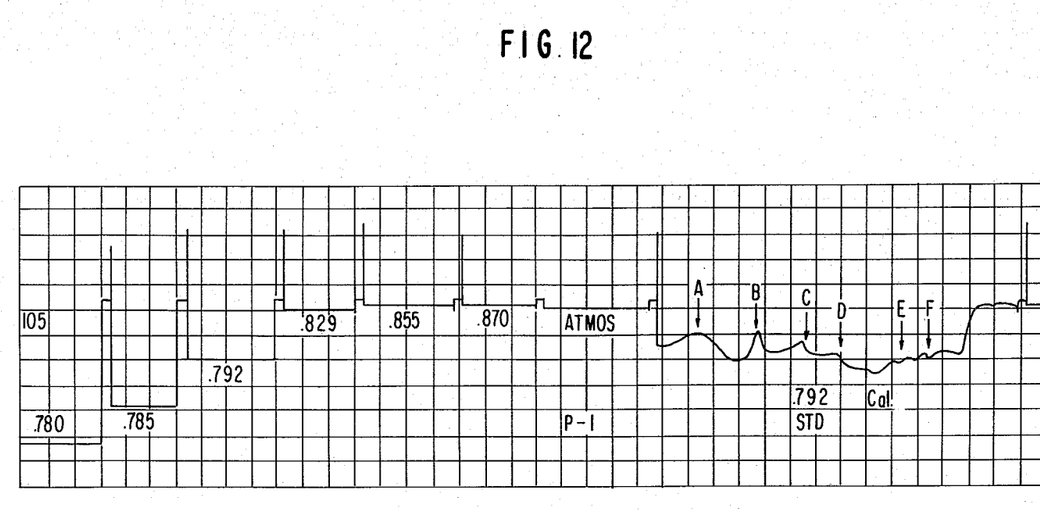
FIG. 12 is a copy of the chart recording of the probe of FIG. 2 as it traverses the interior of the tube of FIG. 9.

FIG. 12 is based on copy of the chart recording of a P-1 probe as it traverses the tube of FIG. 9. It should be noted that the direction of travel of the probe from right to left in the direction of the arrow in FIG. 9 is reversed as compared to the direction of the recording pen travel from left to right in FIG. 12. The calibration levels of the tube interior diameter are as indicated on the left side of FIG. 12 and the recorder pen travel as the probe traverses the tube is on the right side of FIG. 12. In this particular test, calibrating tubes of equally increasing increments of diameter were not readily available, so the calibration values are not at equal increments of value. Further, since the amplitudes of the recorded back pressures are on a logarithmic scale, rather than a linear scale, appropriate interpelation of values is required in this instance, although a conversion to a linear scale would be possible by means obvious to those skilled in the recorder art. The letters A through F designating the protruberances generated by the recorder pen in FIG. 12 correspond to the similarly designated letters of the defects indicated in the tube of FIG. 9. The defects in the tube of FIG. 9 were artificially machined into the tube and no meaningful numerical evaluation can be made with respect to the drilled holes of features B, C and D, inasmuch as these do not represent a finite thinning of the tube wall but actually vent a portion of the air flow to the atmosphere, hence the value of the generated back pressure is not particularly meaningful.

Figure 13:
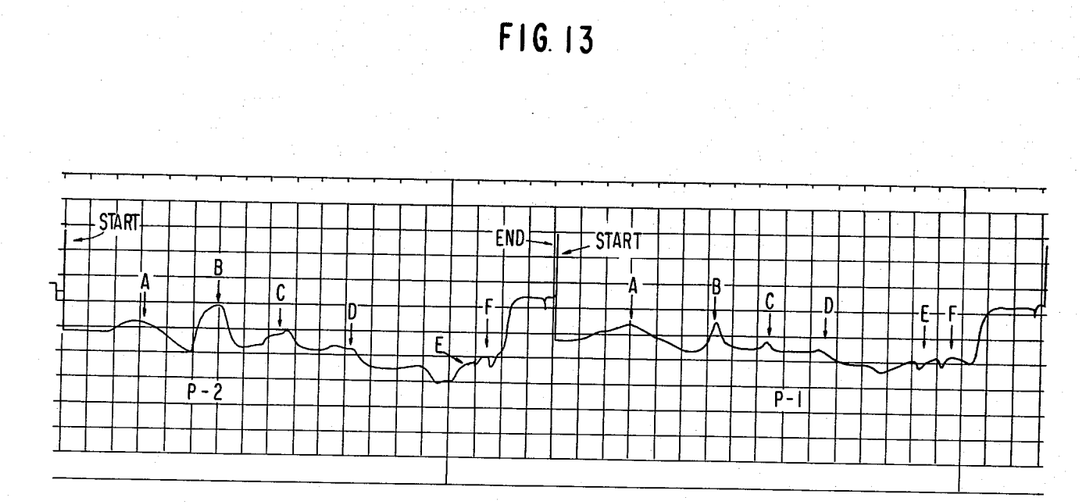
FIG. 13 is a copy of the chart recordings of the probes of FIG. 2 and of FIG. 6 as they traverse the interior of the same tube.

FIG. 13 shows a comparison between the results achieved by utilizing probes P-1 and P-2. It is readily apparent that the performance of the probe P-2 is superior to that of probe P-1. A reasonable speculation for the improvement in probe P-2 is that the greater space provided by the recessed portion 25' ahead of the baffle ring 26' creates a lesser turbulent flow through the probe and particularly across the sharp edged orifice between the outer rim of the baffle ring 26' and the inner wall of the tube. The increase in internal diameter of the tube of FIG. 9 from 0.789" to 0.792" is really apparent in FIGS. 12 and 13 in the general downward trend of the recorder pen travel from left to right.

Figure 14:
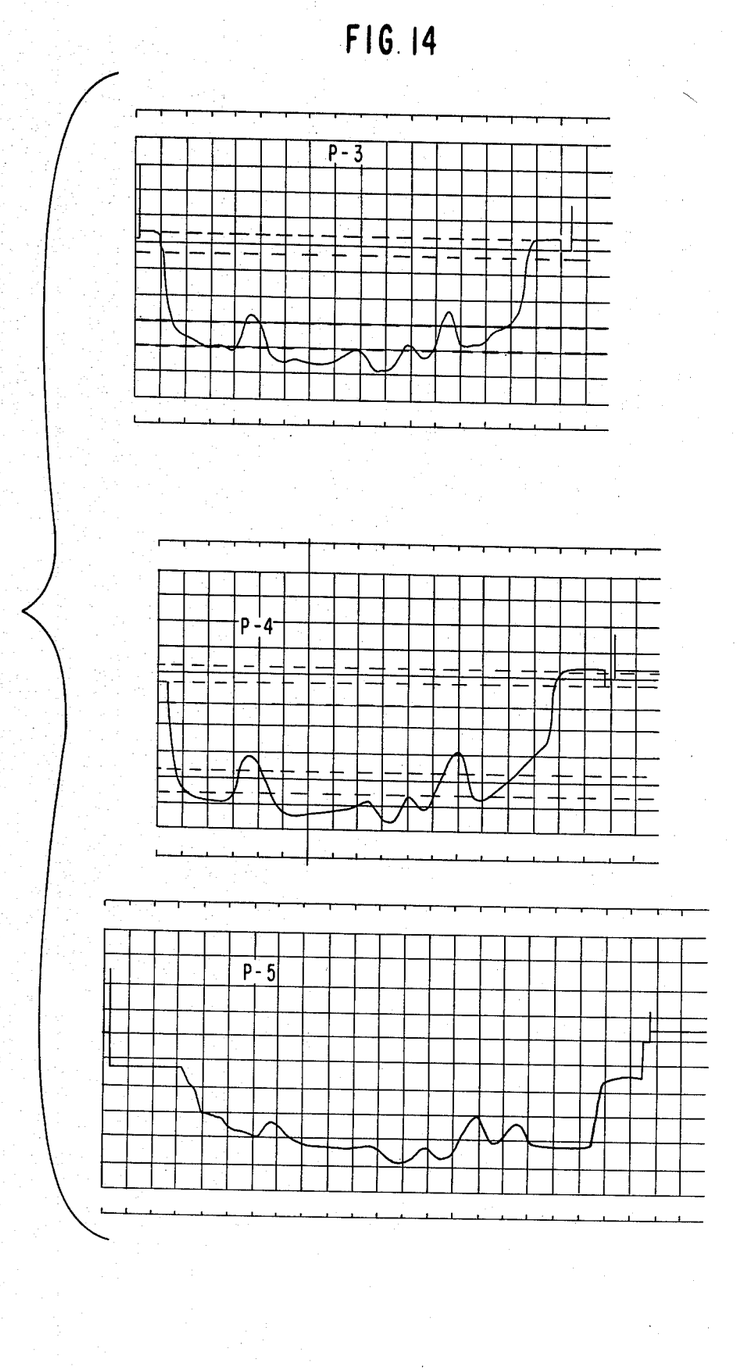
FIG. 14 is a copy of the chart recordings of the probes of FIGS. 7 and 8 and the prior art probe of FIG. 5 as they traverse the interior of the same tube.

FIG. 14 shows a comparison of the performance of probes P-3 (FIG. 7) and Probe P-4 (FIG. 8), as well as a comparison of the performance when utilizing the prior art probe P-5 of FIG. 5. The performance of probes P-3 and P-4 is not greatly different in FIG. 14 but probe P-4 does produce deflection surges of the recorder pen that are a little more distinct than those of probe P-3. This possibly is due to a slight reduction in turbulence across the orifice created by the slightly rounded rim of probe P-3. The performances of probes P-2 and P-3 and P-4 are quite similar although it appears that the configuration of probes P-3 and P-4 is somewhat superior to that of probe P-2. The reason for this possibly is due to the converging and diverging shape of the leading and trailing surfaces of the baffle ring of probes of P-3 and P-4.

The recording of the prior art probe of P-5 is included in FIG. 14 to demonstrate the greatly inferior results achieved when utilizing the prior art probe which does not incorporate the critical feature of a baffle ring having a relatively sharp outer rim edge. Although a probe of this configuration provides a good measure of the average diameter of the tube along which the probe is traversing, the probe does not produce the marked deflections of the recorder pen when encountering localized defects as does the probes of the applicant's invention utilizing the sharp edged baffle ring.

Although this disclosure and FIG. 1 describe a manner of converting the back pressure generated in the probe into recorded signals that are calibrated in a manner to provide a zero base and amplitude signals that are a direct indication of the depth of defects in the tubing through connecting the differential pressure transducer across the probe and a pressure regulating device, obviously other means could be provided of establishing a zero based value of back pressure and creating an output from a pressure transducer that would create signals in a recorder that translate the back pressure measured by the transducer into values that conform to the depth of the deteriorated areas in the tubing. This could be accomplished by connecting the probe to a pressure transducer in which the output signals of the measured pressure could be modified electronically to achieve the same results as the differential pressure transducer and pressure regulating device disclosed herein.

What is claimed is:

1. A probe for use in apparatus in detecting, measuring the extent of and locating localized deteriorated areas on the interior of tubes, said probe being an elongated cylindrical member having an axially extending recessed center section of substantially lesser diameter than and lying between two axially extending end portions, said probe containing an internal passage extending from the outer end of one of said end sections to an aperture in said recessed center section, and a narrow baffle ring extending outwardly transversely of said center section between said aperture and the other one of said end sections, the diameters of said end sections and baffle ring being closely equal, said outer end section containing at least one opening extending between said recessed center section and the outer end of said other end section, said baffle ring having a circumferential cross section tapering from a thicker portion at the juncture with said recessed center section to a thin portion extending circumferentially of the outer tip.

2. The probe of claim 1 wherein the axial length of said one end section is substantially greater than said other end section.

3. The probe of claim 2 wherein the diameter of said one end section is slightly larger than that of said other end section.

4. The probe of claims 1 or 2 wherein the thickness of the outer tip of said baffle ring is no greater than 0.050 inches.

5. The probe of claims 1 or 2 wherein the contour of said baffle ring outer tip is slightly rounded.

6. The probe of claim 2 wherein the length of said center section is substantially greater than that of said other end section.

7. The probe of claim 6 wherein said baffle ring is located a substantial fraction of the distance between said end sections from said one end section.

8. The probe of claim 7 wherein said aperture is located from said one end section a substantial fraction of the distance between said one end section and said baffle ring.

9. In an apparatus for measuring the degree of deterioration on the interior of tubing including a source of constant gas pressure connected in parallel to a means for establishing a selected output pressure and to the supply air end of a pneumatic probe, a differential pressure transducer connected between the output of said selective output pressure means and the supply end of said probe, and means recording the signals generated by said differential pressure transducer, the improvement for detecting, locating and measuring the extent of localized deteriorated areas wherein said probe is configured to pass freely along the interior of the tubing and comprises an elongated cylindrical member having an axially extending one end portion at said probe supply end of a diameter closely matching the interior tube diameter, said one end portion adjoining a substantially lesser diameter recessed, baffle chamber portion connected by an internal passage to said probe supply end, and a baffle ring extending transversely of and outwardly of said baffle chamber portion beyond said internal passage opposite said probe supply end, said baffle ring having a diameter substantially the same as said probe supply end portion and having a thin outer rim establishing in conjunction with the tube inner wall a sharp edged orifice across which gas introduced through said internal passage flows.

10. The apparatus of claim 9 wherein said probe comprises an elongated cylindrical member having an axially extending recessed center section of substantially lesser diameter than and lying between two axially extending end portions, said probe containing an internal passage extending from the outer end of one of said end sections to an aperture in said recessed center section, and a narrow baffle ring extending outwardly transversely of said center section between said aperture and the other one of said end sections, the diameters of said end sections and baffle ring being closely equal, said other end section containing at least one opening extending between said recessed center section and the outer end of said other end section, said baffle ring having a circumferential cross section tapering from a thicker portion at the juncture with said recessed center section to a thin portion extending circumferentially of the outer tip.

11. The apparatus of claim 10 wherein the diameter of said one end section is slightly larger than that of said other end section.

12. The apparatus of claim 9 wherein said probe comprises an elongated cylindrical member having an axially extending recessed center section of substantially lesser diameter than and lying between two axially extending end portions, said probe containing an internal passage extending from the outer end of one of said end sections to an aperture in said recessed center section, and a narrow baffle ring extending outwardly transversely of said center section between said aperture and the other one of said end sections, the axial length of said one end section being substantially greater than said other end section and the length of said center section being substantially greater than that of said other end section, the diameters of said end sections and baffle ring being closely equal, said other end section containing at least one opening extending between said recessed center section and the outer end of said other end section, said baffle ring having a circumferential cross section tapering from a thicker portion at the juncture with said recessed center section to a thin portion extending circumferentially of the outer tip.

13. The apparatus of claim 12 wherein said baffle ring is located a substantial fraction of the distance between said end sections from said one end section.

14. A method of detecting, measuring the extent of and locating localized defects on the interior wall of tubing comprising the steps of: (a) into a base standard test tube having an unflawed interior with a diameter equal to that of a tube of the type being tested inserting a pneumatic probe adapted to pass along the length of said standard test tube and comprising an elongated cylindrical member having an axially extending portion at one end of a diameter closely matching the interior diameter of said basic standard test tube, said one end portion adjoining a substantially lesser diameter baffle chamber portion connected by an internal passage to a source of gas pressure and a baffle ring of substantially the same diameter as said one end portion and extending transversely of and outwardly from said baffle chamber portion, said baffle ring having a circumferential cross section tapering from a thicker portion at the juncture with said lesser diameter baffle chamber portion to a thin outer rim; (b) directing a flow of gas from said source at a predetermined flow rate into said probe baffle chamber and across the sharp edged orifice established between the thin outer edge of said baffle ring and the basic standard test tube interior wall: (c) measuring the back pressure established between said flow limiting device and said probe during step (b) and recording the measured back pressure of said basic standard test tube as a zero based value, (d) inserting said probe into additional flawless test tubes having internal diameters of increasing size increments over that of said base standard test tube and measuring and recording the increased back pressure established by each said additional test tube with relationship to said standard tube zero based value, (e) inserting said probe into one end of a potentially flawed tube to be inspected and drawing said probe along the length of said inspected tube and (f) recording the back pressures established between said flow limiting device and probe along each increment of length of the inspected tube with relationship to the back pressures generated in steps (c) and (d).

15. The method of claim 14 wherein said zero based back pressure value of step (c) is established by connecting a variable pressure regulating device between said pressure source and one side of a differential pressure transducer with the other side being connected to the air inflow side of said probe and adjusting the output of said pressure regulating device to establish a zero differential between the pressure on both sides of said differential pressure transducer.

16. The method of claim 15 wherein said zero measured back pressure of step (c) and the measured back pressures of step (d) are recorded by the generation of a signal in said differential pressure transducer proportional to the pressure differential measured by said transducer and transmitting said signal to a chart recording device.

17. The method of claims 14 or 15 wherein a predetermined flow rate is established into said probe by passing the air flowing from said source to said probe through a constant flow limiting device.

* * * * *